United States Patent [19]

Preston

[11] Patent Number: 4,871,895
[45] Date of Patent: Oct. 3, 1989

[54] METHOD AND APPARATUS FOR WELDING A NEW STUD ON TO THE END OF A BROKEN OFF STUD AND NEW STUD

[76] Inventor: Gary N. Preston, P.O. Box 582, Okmulgee, Okla. 74447

[21] Appl. No.: 251,333

[22] Filed: Sep. 30, 1988

[51] Int. Cl.[4] .............................................. B23K 9/20
[52] U.S. Cl. ...................................... 219/99; 219/98; 219/136
[58] Field of Search ............................ 219/98, 99, 136

[56] References Cited

U.S. PATENT DOCUMENTS

| | | | |
|---|---|---|---|
| 3,363,084 | 1/1968 | Busing | 219/99 |
| 3,641,305 | 2/1972 | Ritter et al. | 219/99 |
| 4,189,978 | 2/1980 | Mauer | 219/98 |

*Primary Examiner*—Clifford C. Shaw
*Attorney, Agent, or Firm*—William S. Dorman

[57] ABSTRACT

A welding system for welding a new stud onto the end of a broken-off stud which comprises a welding gun having a forward end and a rear end, the forward end of the gun supporting a new stud to be welded to the end of a broken-off stud, the new stud being threaded at least along a rear portion thereof, a shroud mounted at the forward end of the gun and surrounding the new stud, the forward end of the new stud projecting outwardly from the gun into the shroud, the new stud having a longitudinal bore extending from the rear end thereof to a location adjacent to the forward end thereof where the bore flares outwardly to a larger bore at the forward end of the new stud, the new stud also being provided with slots at the forward end diametrically opposite from each other and in the region of the enlarged bore, a coated welding rod supported by the gun and extending from a location adjacent the rear of the gun through the bore in the new stud and to a point adjacent the forward end of the new stud, the welding rod having an internal steel core and being coated with a nonconductive flux, a high frequency voltage connected between the core of the welding rod and the broken-off stud to initiate a welding arc when the new stud is in abutting relation with the broken-off stud, a d.c. welding current connected between the core of the welding rod and the broken-off stud following the initiation of the arc by the high frequency voltage and a drive motor simultaneously with the initiation of the d.c. welding current to advance the welding rod through the new stud and towards the broken-off stud.

7 Claims, 4 Drawing Sheets

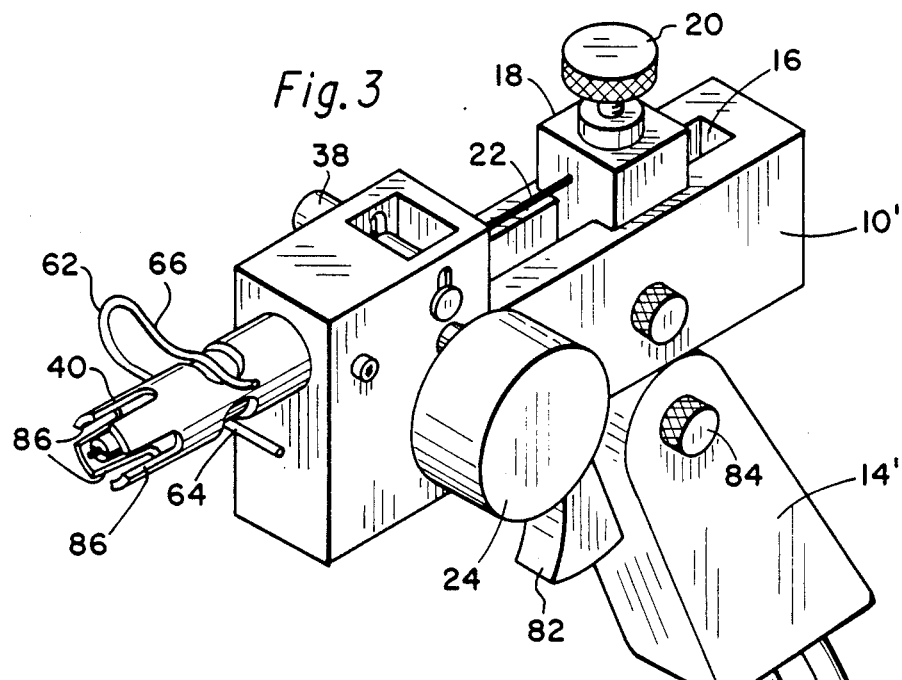
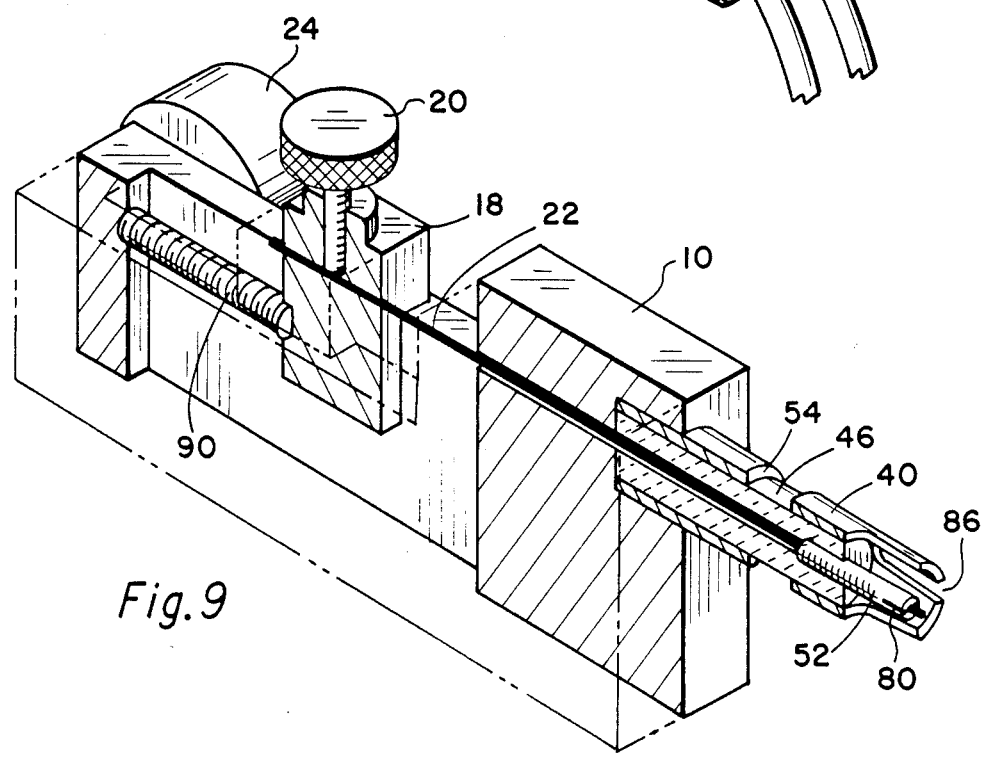

METHOD AND APPARATUS FOR WELDING A NEW STUD ON TO THE END OF A BROKEN OFF STUD AND NEW STUD

BACKGROUND OF THE INVENTION

1. Field of the Invention

The present invention relates to an apparatus and method for welding a stud onto the end of a broken-off stud. This invention also relates to the stud which is used in the welding process. More particularly, the present invention relates to a welding (stud) gun, the overall welding process, and the stud which is used in the welding process.

2. The Prior Art

The problem which is addressed by the present invention is broadly in the automotive field. More precisely, however, the problem relates to the attachment of an exhaust pipe section to the exhaust manifold of an automobile engine. In this regard, the manifold is normally provided with a circular flange against which the enlarged end of an exhaust pipe section is adapted to fit. A gasket or washer is generally interposed between the enlarged end of the exhaust pipe section and the seat on the flange. A collar is generally received on the exhaust pipe section on the opposite side of the enlarged portion from the manifold flange. Normally, two to four studs which are threaded into the manifold flange extend outwardly from the manifold flange and pass through an equal number of holes in the collar. Threaded nuts are placed on the threaded ends of the studs which project through the collar and are thereafter tightened so as to draw the collar close to the manifold to produce a tight connection between the end of the exhaust pipe and the manifold.

Occasionally, when one is replacing an exhaust pipe section, he will discover that one of the studs has been broken off, generally adjacent the surface of the flange or sometimes even internally within the flange. One of the practices in the past has been to remove the broken stud so as to put a new stud in place. However, this removal generally involves drilling a hole into the broken stud and using an "easy-out" or some other suitable device to remove the broken stud. This method of removing the broken stud is not only difficult, but quite time-consuming. As an alternative to removing the stud, one company (Nickson Industries of Plainville, Connecticut) proposes the use of a C-clamp which is placed over the broken stud and becomes a permanent connection between the exhaust pipe and the manifold. However, as one might visualize, continued vibration of the automobile over the roadway will cause the C-clamp to come loose and the repair is comprised.

With applicant's invention in mind, a search was made in the prior art. No references were found which were considered sufficiently pertinent to require any comment. However, the following U.S. Patents were uncovered in the search:

| | | |
|---|---|---|
| 2,256,480 | 2,429,967 | 2,475,907 |
| 2,482,910 | 2,539,136 | 2,563,107 |
| 2,635,403 | 2,760,797 | 2,768,794 |
| 2,787,943 | 2,795,176 | 2,817,003 |
| 2,860,230 | 3,021,420 | 3,095,951 |
| 3,204,083 | 3,279,047 | 3,352,189 |
| 3,363,084 | 3,408,472 | 3,409,088 |
| 3,439,567 | 3,487,733 | 3,504,598 |
| 3,522,409 | 3,641,310 | 3,732,023 |

-continued

| | | |
|---|---|---|
| 3,826,893 | 3,892,942 | 3,952,811 |
| 4,045,643 | 4,137,681 | 4,138,909 |
| 4,458,763 | | |

SUMMARY OF THE INVENTION

The present invention involves a welding gun or stud gun which is used to attach a new stud to the end of a broken-off stud (as previously described) on the exhaust manifold of an automobile engine. More particularly, we are concerned with the flange on the exhaust manifold of the automobile engine where the exhaust pipe is attached. The welding gun of the present invention is provided with means for supporting a new stud at the welding end of the gun. A block which is slideably mounted in the welding gun supports a coated welding rod which passes through a bore in the new stud. A combined d.c. and high frequency a.c. welding current is applied between the gun and the manifold. When the welding operation commences, the new stud is in axial alignment with the end of the broken stud and the end of the new stud is in abutting relation with the broken end of the old stud. Upon initiation of the welding operation, the slideable block advances the coated welding rod into the arc which is created by the successive initiation of the a.c. and d.c. welding currents and or voltages. The new stud is provided with a bore, as indicated above, through which the coated welding rod passes. The internal bore in the stud, however, flares out somewhat adjacent the forward end of the stud and the stud is also provided with slots adjacent the forward end; i.e. the end of the stud which is in abutting relation with the broken-off stud. The rear portion of the stud is provided with threads. When the welding operation is completed, the welding gun is removed from the new stud which is now permanently attached to the broken off stud. The exhaust pipe can now be placed in abutting relationship with the flange, a collar can be inserted over the stud, including the new stud created by the welding operation, and the nuts can be put on the threaded ends of the studs and tightened to provide a secure connection between the exhaust pipe section and the manifold.

BRIEF DESCRIPTION OF THE DRAWINGS

FIG. 3 is a perspective view of a modified form of the welding gun shown in FIG. 1;

FIG. 9 is a perspective view of a diagrammatic representation of a modified means for moving the slidable block.

DETAILED DESCRIPTION OF THE PREFERRED EMBODIMENTS

Figure 1:
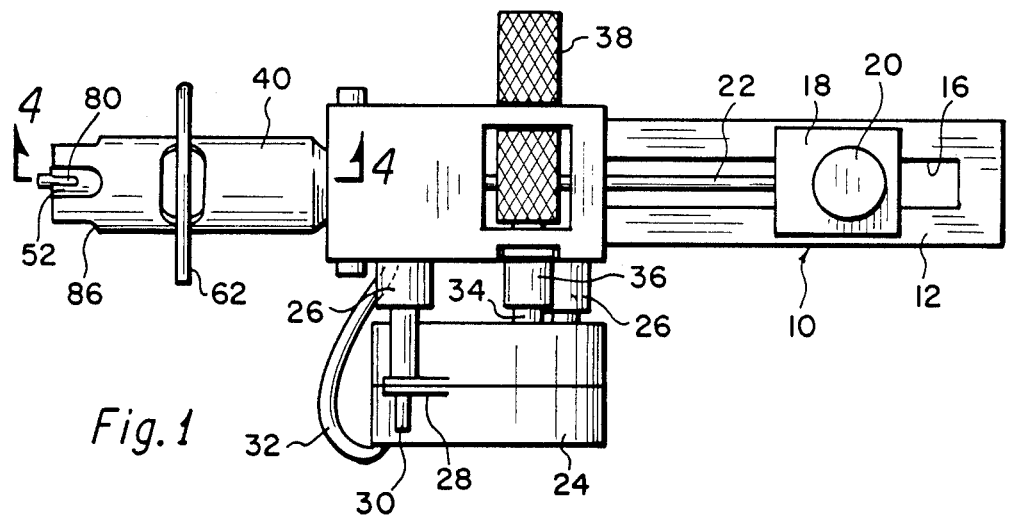
FIG. 1 is a plan view of a welding gun constructed in accordance with the present invention.
Figure 2:
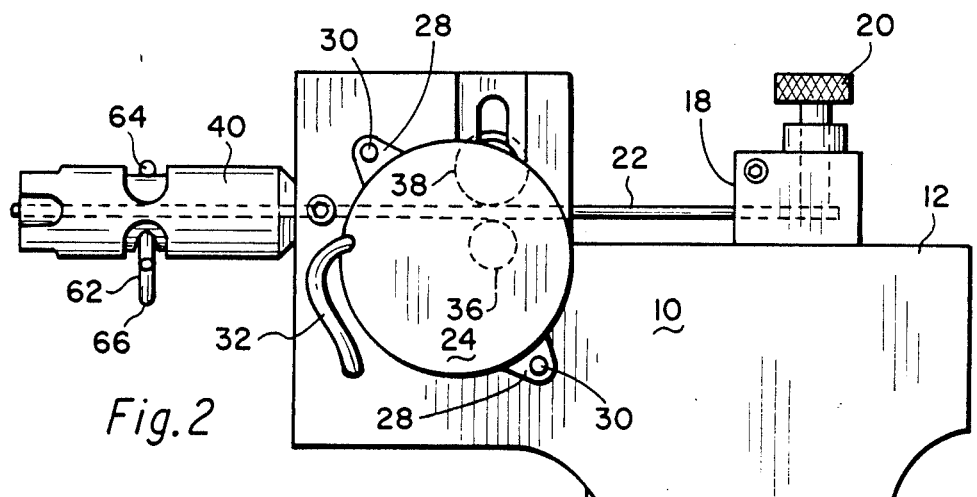
FIG. 2 is a front elevation of the welding gun shown in FIG. 1.
Figure 10:
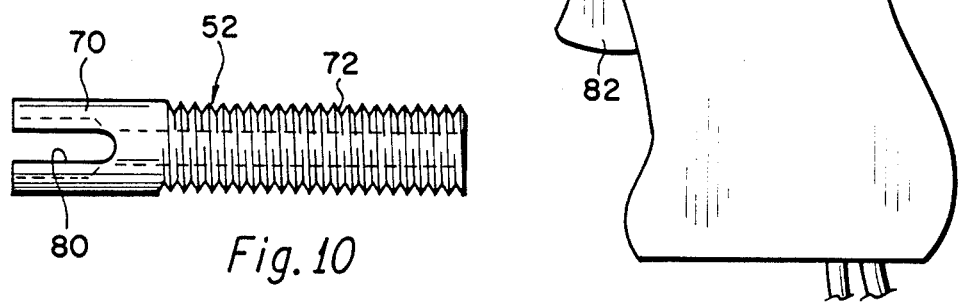
FIG. 10 is an elevational view of the stud itself showing the slots thereon.
Figure 5:
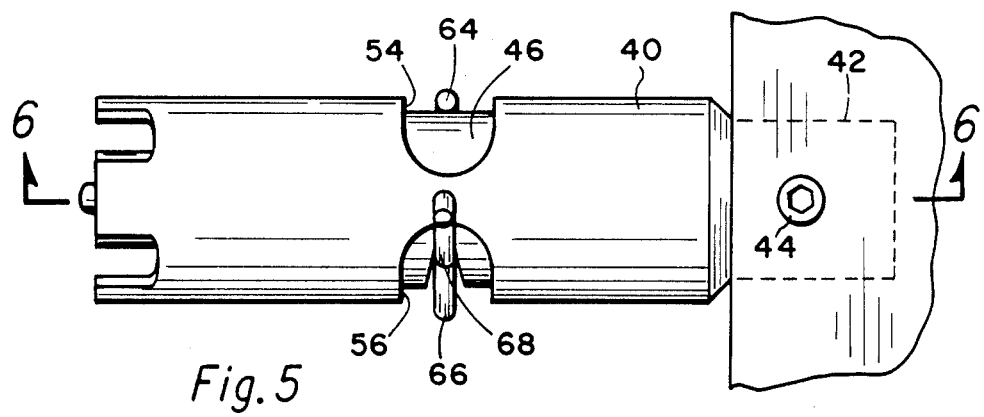
FIG. 5 is a partial front elevation, on an enlarged scale, of the left hand portion of the gun shown in FIGS. 1 and 2 and representing essentially the same structure shown in FIG. 4.

Referring the drawings in detail, FIGS. 1 and 2 show a welding gun 10 having a body 12 and a handle 14. The center of the body is provided with a rectangular opening 16 in which a block 18 is permitted to slide. The block 18 is provided with an adjustable thumb screw 20 which is adapted to bear, at its lower end, against a welding rod 22 which is covered with a nonconductive flux material (not shown). The welding rod will normally have a bare or uncoated portion of about one inch in length which should be disposed below the lower end of the thumb screw.

A motor 24 is mounted on one side of the gun by means of horizontal bosses 26 which are attached to one side of the gun 10. The other ends of the bosses 26 engage ears 28 on the housing for the motor 24 and screws 30 pass through the ears 28 and into the bosses 26 to hold motor 24 in position. The motor is connected to a convenient source of electrical power (not shown) by means of power cord 32. The motor has an output shaft 34 which connects with a lower knurled roller 36. The coated welding rod 22 passes between the knurled roller 36 and an upper knurled roller 38 which is positioned to bear against the upper side of the rod 22. The upper roller is urged downwardly by about four ounces of spring pressure created by spring (not shown) located within internal recesses (not shown) in the body of the gun.

At the forward, or left-hand end of the gun 10 is a shroud 40 which can be made out of brass, teflon or any suitable material. The shroud is held in position in a recess 42 in the body of the gun 10 by means of a pair of screws 44. The shroud is provided with a hollow cylindrical liner 46 which is made of any suitable plastic or other non-conductive (electrically) material. The liner 47 is provided with a central bore 48 in which a metallic (brass or copper) sleeve 50 is received. The metallic sleeve has an internal diameter which is essentially equal to the outer diameter of a stud 52 which is made in accordance with the present invention.

In order to assist in maintaining the stud 52 inside the sleeve 50, the shroud 40 is provided with recesses 54 and 56 at the upper and lower portions thereof and the liner 46 is similarly provided with a notch 58. Further, the sleeve 50 is provided with an opening 60 along the lower side. A clip 62 is provided to retain the stud 52 within the shroud 40 during the welding operation. This clip 62 is in a shape similar to that of a hairpin having a straight portion or leg 64 and a wavy leg 66. The straight leg 64 will pass through the recess 54 on the shroud 40 and bear against one side of the liner 46. The wavy leg 66 will pass through the other opening or recess 56 in the shroud 40 such that the center portion 68 will be received in the notch 68 of the liner and the opening 60 in the sleeve 50 so as to bear directly against the rear threaded portion of the stud 52. Thus, the clip 62 lightly holds the stud 52 within the shroud 40 during the welding operation. When the welding operation is completed, as will hereinafter appear, the gun is withdrawn and the clip will not prevent the easy removal of the gun from the welded stud.

Figure 4:
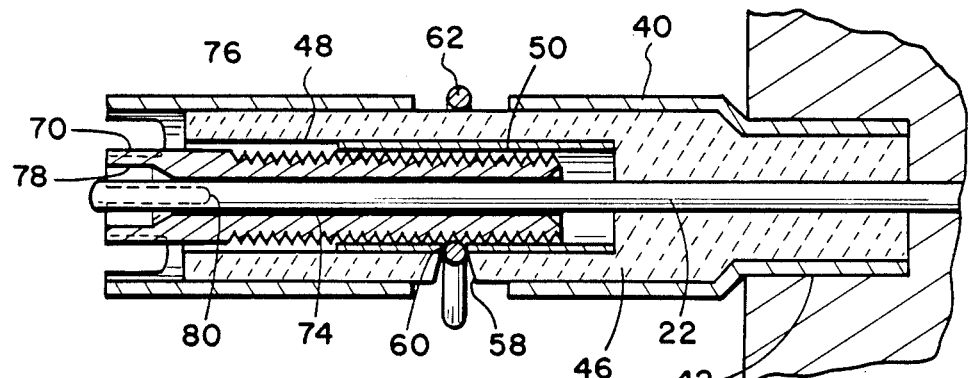
FIG. 4 is a sectional view, on an enlarged scale, taken along section line 4-4 of FIG. 1.
Figure 6:
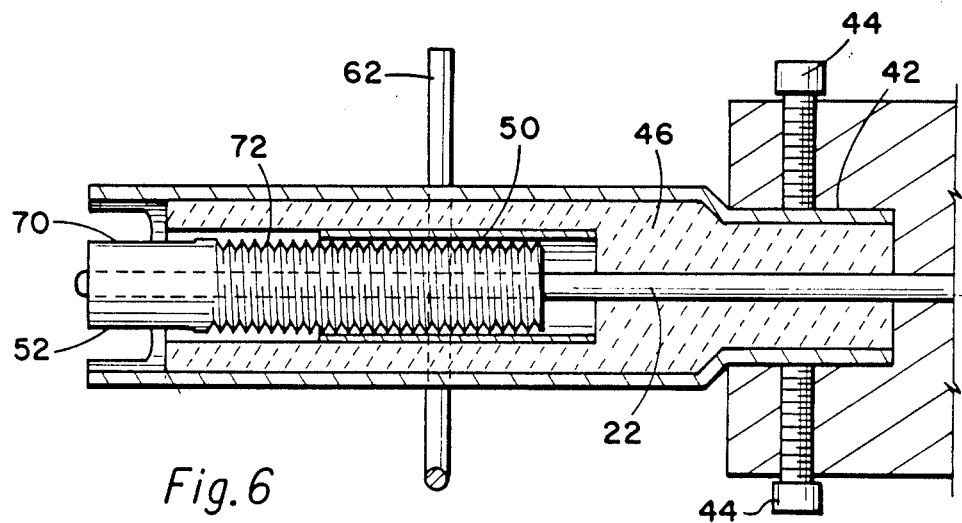
FIG. 6 is a sectional view taken along section line 6—6 of FIG. 5.

The design of the stud 52, shown best in FIGS. 4 and 6, is important as far as the present invention is concerned. This stud 52 is provided with a forward unthreaded end 70 and a rear threaded portion 72. As will hereinafter appear, when the stud 52 is welded to the broken-off stud, a nut (not shown) can then be placed or threaded onto the threaded portion 72 to properly secure the exhaust pipe (not shown) to the manifold (not shown). From the left hand end of the stud 52 there is an internal bore 74 which extends to approximately the midportion of the unthreaded end 70. This bore 74 is slightly larger than the outer diameter of the coated rod 22 so as to permit the rod 22 to be fed through the stud 52. Where the bore 74 meets the midpoint, internally, of the unthreaded portion 70, the bore flares out, as at 76, to a larger opening 78. The end of the stud is provided with a pair of slots 80 on opposite sides of the stud. These slots 80 are extremely important. It has been discovered, without the slots, that a welding arc can be quickly extinguished during the welding process. Slots 80 also provide a means whereby the flux can run out. The shroud 40 is also provided with four recesses 86 to permit gases, etc. to escape during the welding process.

In operation, the positive lead, for example, of a d.c. welding current (not shown) can be connected to the thumb screw 20. In this regard, the thumb screw 20 is turned so that it comes in contact with the uncoated bare metal of the end of the rod 22. In the event that the end of the rod beneath the thumb screw is coated, the thumb screw is turned sufficiently so that it penetrates the nonconductive coating on the rod 22 so as to come into electrical contact with the metallic interior of the rod 22. The other, or negative lead of the d.c. welding source can be connected, for example, to the manifold which contains the broken off stud. A high frequency welding current (not shown) is also connected to the thumb screw 20 and the manifold, respectively. The gun 10 is provided with a trigger 82. The internal details of the circuitry inside the handle 14 are considered to be conventional and, hence, are not shown. However, it should be understood that depressing the trigger 82 will simultaneously cause three events to occur; first of all, the high frequency welding current is initiated; secondly, the d.c. welding current is initiated; and, thirdly, power to the motor 24 is turned on to commence movement of the rod 22 towards the left as it appears in FIGS. 1 and 2. To be more specific, the movement of the rod and the application of the d.c. welding current occur simultaneously after the high frequency current initiates the arc. In using the gun 10, one would place the same so that the end of the stud 52 was butting against the broken stud. The gun would be lined up so that the stud 52 was in axial alignment with the broken stud. The trigger 82 is now depressed and the welding arc is struck. At the same time, the welding rod 22 will proceed into the arc. The end of the stud 52 will then be welded onto the end of the broken stud (not shown). Thereafter, the gun is removed. The stud 52 is now connected to the broken stud and can be used as a new stud. The collar (not shown) which surrounds the exhaust pipe (not shown) can now be positioned over all of the studs on the manifold and the nuts can be tightened on the studs, including the new stud which has been created by the welding process of the present invention.

FIG. 3 represents a modification of the welding gun shown in FIGS. 1 and 2 in that the handle 14' is angularly adjustable with respect to the main body 10'. This adjustment is permitted by means of a nut 84 which can be loosened to permit the angular adjustment of the handle 14' about the axis of the nut. When the proper angular position is achieved for the handle 14', the nut 84 is then tightened.

Figure 8:
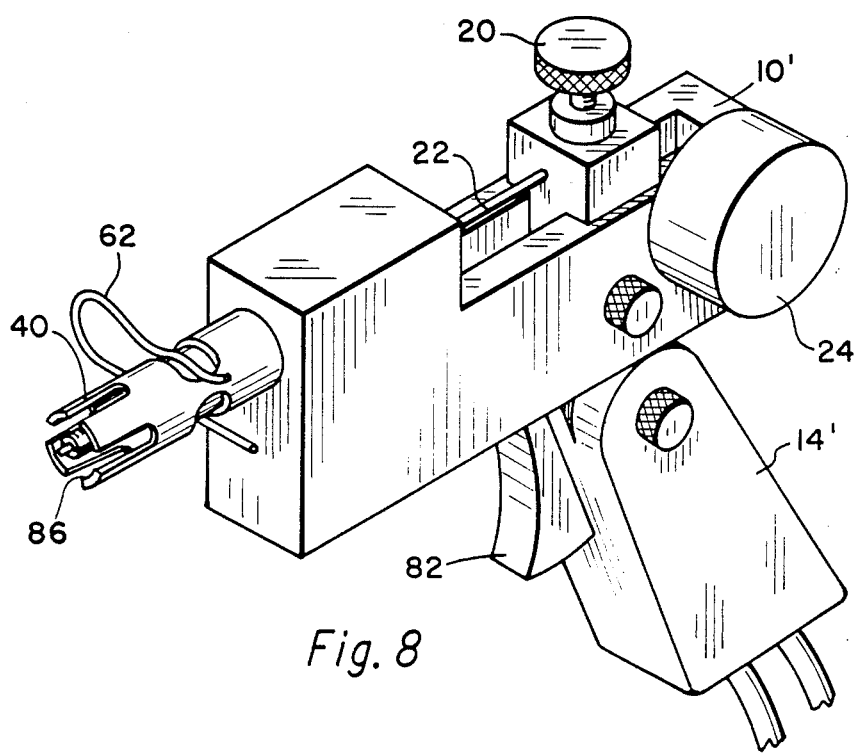
FIG. 8 is a perspective view of another modified form of welding gun made in accordance with the present invention.

As shown in FIGS. 1, 2 and 3, the drive motor 24 is mounted to the side of the gun adjacent the forward end thereof, and the driving means are provided by a pair of knurled rollers. However, other means can be provided for moving the rod 22 through the stud 52. For example, as shown in FIG. 8, the motor 24 can be mounted at the rear of the gun and in axial alignment with the longitudinal center of the gun. Alternatively, the motor can be mounted to the side of the gun adjacent to the rear thereof, as shown in FIGS. 8 and 9. Numerous different means, such as rack-and-pinion, worm gear, machine screw, etc., could be substituted for the specific drive means shown in FIGS. 1, 2 and 3. A diagramatic illustration of an alternative drive mechanism is shown in FIG. 9. In this Figure, a threaded shaft 90 is mounted for rotation internally within the body of the gun 10. The shaft 90 can be caused to rotate by means of suitable gearing (not shown) between the output shaft of the motor 24 and the shaft 90. The shaft 90 can be considered as a machine screw or as a worm. In either case, the block 18 would be provided with a threaded portion (not shown) which would mesh with the threads on the shaft 90; thus, if 90 were a machine screw, a machine nut (not shown) could be placed in or attached to the block 18 so that rotation of the shaft 90 would cause the block 18 to move back and forth in the slot 16. Similarly, if the shaft 90 were a worm, then the bottom of the block 18 could be provided with male portions which would fit in the female grooves on the worm so that rotation of the worm would cause the block 18 to move back and forth in the slot 16. Likewise, a rack (not shown) could be attached to the block 18 and a pinion (not shown) could be placed on the shaft of the motor 24 to cause the block 18 to move back and forth in the slot 16 by means of a rack-and-pinion drive.

Figure 7:
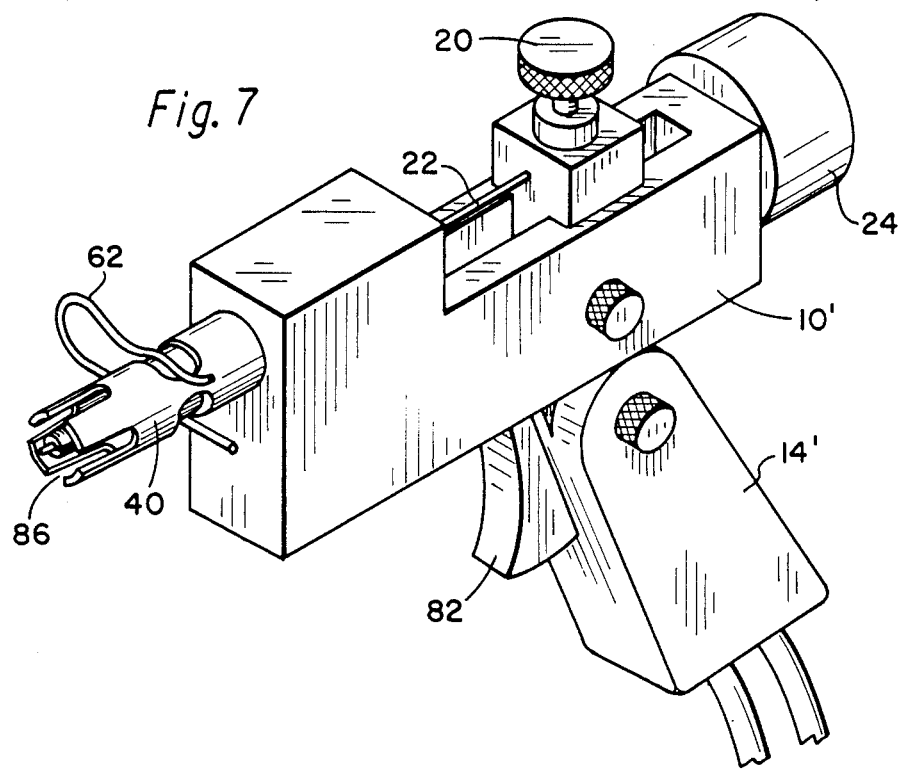
FIG. 7 is a perspective view of a modified form of welding gun made in accordance with the present invention.

In the case of FIG. 7, the drive motor 24 has a shaft attached directly to the threaded shaft 90 in FIG. 9, or, it could be attached to the shaft 90 by means of intermediate gearing (not shown).

The motor 24 is preferably some small inexpensive a.c. motor. Purely by way of example, and not by way of limitation, the motor shown in these drawings is one which is manufactured by France Motor of Fairview, Tenn., Model No. 60-3, and it operates at 26.4 r.p.m., at 50 to 60 Hz a.c. current and 120 volts a.c. The d.c. welding source, purely by way of example, provides 60 volts d.c. and a current of 25 to 100 amps. The d.c. welding source is one manufactured by Hein-Warner of Milwaukee, Wis. The high frequency source is similar to the circuit used on a TIG welder, and having an output of 3,000 to 4,000 volts at a frequency of approximately 20 mhz. The circuit actually employed in the device illustrated herein was taken from a high frequency welder manufactured by Miller Company in Petersburg, Wis., Model HF-15-1WG. Any other suitable high frequency source could be employed. The welding rod is #200 stainless steel which is insulated with flux and which is manufactured by X-Ergon of Irving, Tex.

Whereas the present invention has been described in particular relation to the drawings attached hereto, it should be understood that other and further modifications, apart from those shown or suggested herein, may be made within the spirit and scope of this invention. For example, although certain of the parts have been described as being made out of metal, such as the shroud and the sleeve inside the liner, these parts could be made out of teflon or other rugged material. The specific means for holding the bolt within the liner has been described in terms of a clip which lightly engages one side of the threaded portion of the stud through recesses in the shroud, the liner and the sleeve; however, with proper dimensioning of the stud and the liner, the clip could be eliminated. Also, a ball detent mounted on the inner surfcae of the liner could be employed in lieu of the clip. Preferably, all of the main components of the gun are made of nonconductive material except, of course, the motor, the thumb screw, the wiring, etc. The nonconductive material could be Teflon, polyurethane or other suitable plastic material.

What is claimed is:

1. A welding apparatus for welding a new stud onto the end of a broken-off stud which comprises a welding gun having a forward end and a rear end, means at the forward end of the gun for supporting a new stud to be welded to the end of a broken-off stud, the new stud being threaded at least along a rear portion thereof, a shroud mounted at the forward end of the gun and surrounding the new stud, the forward end of the new stud projecting outwardly from the gun into the shroud, the new stud having a longitudinal bore extending from the rear end thereof to a location adjacent to the forward end thereof where the bore flares outwardly to a larger bore at the forward end of the new stud, the new stud also being provided with slots at the forward end diametrically opposite from each other and in the region of the enlarged bore, a coated welding rod supported by the gun and extending from a location adjacent the rear of the gun through the bore in the new stud and to a point adjacent the forward end of the new stud, the welding rod having an internal steel core and being coated with a nonconductive flux, means for connecting a high frequency voltage between the core of the welding rod and the broken-off stud to initiate a welding arc when the new stud is in abutting relation with the broken-off stud, means for connecting a d.c. welding current between the core of the welding rod and the broken-off stud following the initiation of the arc by the high frequency means, and means operating simultaneously with the initiation of the d.c. welding current to advance the welding rod through the new stud and towards the broken-off stud.

2. The improvement according to claim 1 wherein the gun is provided with a longitudinal opening, a block slideably mounted in the longitudinal opening for sliding movement towards and away from the forward end of the gun, the rear end of the welding rod being received in the block, and adjustable metallic thumb screw being received in the block and being rotatable to bear against the metallic core of the welding rod, the thumb screw constituting the means for connecting the high frequency voltage and the d.c. welding current to the core of the welding rod, and driving means mounted on the gun for moving the block towards the forward end of the gun.

3. The improvement according to claim 1 wherein the means for supporting the new stud includes a nonconductive sleeve mounted in the forward end of the gum and means for retaining the new stud in the sleeve during the welding operation.

4. A weldable stud for welding onto the end of a broken-off stud comprising an elongated cylindrical body having a forward end and rear end, the forward end of the weldable stud being adapted to be placed in abutting relation with the end of a broken-off stud and in axial alignment therewith during a welding operation, the rear end of the stud being provided with threads to receive thereon a threaded nut, the weldable stud having a longitudinal bore extending from the rear end thereof to a location adjacent the forward end thereof for receiving therein a coated welding rod, said longitudinal bore merging with a second bore of larger diameter at said location adjacent the forward end of said weldable stud, the second longitudinal bore extending to the forward end of said stud, said weldable stud being provided with a pair of slots at the forward end of said stud and extending rearwardly over said second bore.

5. A method for welding a new stud onto the end of broken-off stud which comprises placing the new stud in abutting relation with the end of broken-off stud and in axial alignment therewith, inserting a coated welding rod through a longitudinal bore in said new stud, providing a second bore of larger diameter than said first bore at the forward end of the new stud, providing slots on opposite sides of the new stud in the area of the second bore, connecting a high frequency voltage between a metallic core of the welding rod and the broken-off stud to initiate a welding arc, subsequently connecting a d.c. welding current between the core of the rod and the broken-off stud and moving the welding rod through the new stud and towards the broken-off stud simultaneously with the connection of the d.c. welding current.

6. A welding apparatus for welding a new stud onto the end of a broken-off stud which comprises a welding gun having a forward end and a rear end, means at the forward end of the gun for supporting a new stud to be welded to the end of a broken-off stud, the new stud being threaded at least along a rear portion thereof, a shroud mounted at the forward end of the gun and surrounding the new stud, the forward end of the new stud projecting outwardly from the gun into the shroud, the new stud having a longitudinal bore extending from the rear end thereof to a location adjacent to the forward end thereof where the bore flares outwardly to a larger bore at the forward end of the new stud, the new stud also be provided with slots at the forward end diametrically opposite from each other and in the region of the enlarged bore, a coated welding rod supported by the gun and extending from a location adjacent the rear of the gun through the bore in the new stud and to a point adjacent the forward end of the new stud, the welding rod having an internal steel core and being coated with a nonconductive flux, means for conducting a welding current between the core of the welding rod and the broken-off stud, and means operating simultaneously with the initiation of the welding current to advance the welding rod through the new stud and towards the broken-off stud.

7. A method for welding a new stud onto the end of broken-off stud which comprises placing the new stud in abutting relation with the end of broken-off stud and in axial alignment therewith, inserting a coated welding rod through a longitudinal bore in said new stud, providing a second bore of larger diameter than said first bore at the forward end of the new stud, providing slots on opposite sides of the new stud in the area of the second bore, conducting a welding current between a metallic core of the welding rod and the broken-off stud, and moving the welding rod through the new stud and towards the broken-off stud simultaneously with the initiation of the welding current.

* * * * *